(12) United States Patent
Marek

(10) Patent No.: US 10,038,679 B2
(45) Date of Patent: Jul. 31, 2018

(54) CENTRALIZED SECURE DEVICE PAIRING

(71) Applicant: Intel Corporation, Santa Clara, CA (US)

(72) Inventor: Adam Marek, Gdansk (PL)

(73) Assignee: INTEL CORPORATION, Santa Clara, CA (US)

( * ) Notice: Subject to any disclaimer, the term of this patent is extended or adjusted under 35 U.S.C. 154(b) by 992 days.

(21) Appl. No.: 13/726,360

(22) Filed: Dec. 24, 2012

(65) Prior Publication Data
US 2014/0181513 A1 Jun. 26, 2014

(51) Int. Cl.
H04L 29/06 (2006.01)
H04L 9/32 (2006.01)

(52) U.S. Cl.
CPC .......... H04L 63/062 (2013.01); H04L 63/105 (2013.01); H04L 63/126 (2013.01); H04L 9/3247 (2013.01); H04L 2209/127 (2013.01)

(58) Field of Classification Search
CPC ... H04L 9/0825; H04L 9/3263; H04L 9/3247; H04L 63/104; H04L 63/062; H04L 63/065; H04L 63/08; H04L 63/105; H04L 63/12–63/126; H04L 9/0819; H04L 9/083
See application file for complete search history.

(56) References Cited

U.S. PATENT DOCUMENTS

| | | | | |
|---|---|---|---|---|
| 2005/0169461 A1* | 8/2005 | Canard | ................. | H04L 9/3255 380/28 |
| 2006/0168446 A1* | 7/2006 | Ahonen | ................. | H04L 9/0822 713/163 |
| 2008/0307223 A1* | 12/2008 | Brickell | ................. | H04L 63/126 713/158 |
| 2009/0129600 A1* | 5/2009 | Brickell | ................. | H04L 9/3073 380/282 |
| 2011/0060903 A1* | 3/2011 | Yoshida | ................. | H04L 9/302 713/155 |
| 2011/0246756 A1* | 10/2011 | Smith | ................. | H04L 9/3252 713/2 |
| 2012/0023334 A1* | 1/2012 | Brickell | ................. | H04L 9/0844 713/169 |

(Continued)

OTHER PUBLICATIONS

Sundaram et al., Secure Group Communication With Distributed Generation of Private Keys for AD-HOC Networks, 2005.*

*Primary Examiner* — Minh Dinh

(57) ABSTRACT

Various embodiments are generally directed to pairing computing devices for collaborative interaction via a network through a centralized secure device pairing service. An apparatus comprises a controller processor circuit, and a controller storage communicatively coupled to the controller processor circuit to store an initial private key and to store instructions that when executed by the controller processor circuit cause the controller processor circuit to create a first signature using the initial private key, transmit the first signature to an issuing server via a network, receive a group public key and an associated member private key from the issuing server, create a second signature using the member private key, transmit the second signature to a member device via the network; receive a third signature from the member device; and authenticate the third signature using the group public key. Other embodiments are described and claimed herein.

22 Claims, 10 Drawing Sheets

(56) References Cited

U.S. PATENT DOCUMENTS

| | | | | |
|---|---|---|---|---|
| 2012/0084567 A1* | 4/2012 | Hwang | H04L 9/3255 | 713/176 |
| 2012/0257756 A1* | 10/2012 | Huang | H04L 9/0836 | 380/281 |
| 2012/0328101 A1* | 12/2012 | Lakshminarayanan | H04L 63/0823 | 380/258 |
| 2013/0007442 A1* | 1/2013 | Mao | H04L 63/0823 | 713/156 |
| 2013/0294284 A1* | 11/2013 | Popa | H04L 63/065 | 370/254 |
| 2014/0095883 A1* | 4/2014 | Kirillov | H04L 9/3281 | 713/176 |

\* cited by examiner

CENTRALIZED SECURE DEVICE PAIRING

BACKGROUND

The use of multiple computing devices having differing capabilities together in a collaborative manner by a single person has become commonplace. Specifically, it has become commonplace for one person to make use of such a group of computing devices as a work computer system, a home computer system, a smartphone, a tablet computer and a computer system in their car together, along with ancillary computing devices such as a digital wireless communications headset and/or wrist-worn device displaying textual information. It has become expected that information (e.g., emails, appointments, contact information, document, music audio files, maps, digital photos, etc.) associated with that one person will be automatically synchronized and made available among multiple computing devices in such a group such that the one person is able to access and make use of that information using any of them.

An integral part of such collaborative use of a group of computing devices is arranging secure network communications (usually via wireless networks) among them. Each of these computing devices must in some way be configured to share information associated with that one person only with other computing devices of that group. Stated differently, each of those computing devices must be configured to enable relatively seamless sharing of information among them while avoiding sharing that information with other computing devices that are not part of that group.

The most widely accepted and used approach to configuring computing devices to operate in this manner is commonly referred to as "pairing" where that one person brings one of the computing devices that has already been configured for such secure collaborative use in that group into close proximity with another computing device that they wish to add to that group as a new "member." In current incarnations of pairing, wireless signals are exchanged between those two devices over a relatively short range form of wireless communications to convey information from the one computing device that is already a member of that group to the other computing device that is being added. The short range of those wireless communications is often relied upon to ensure security by precluding the possibility of unauthorized devices intercepting those signals. However, this approach does necessitate having possession of at least one of the computing devices that is already a member of that group available to bring into that close proximity to that other computing device to be added as a new member. It is with respect to these and other considerations that the embodiments described herein are needed.

DETAILED DESCRIPTION

Figure 1:
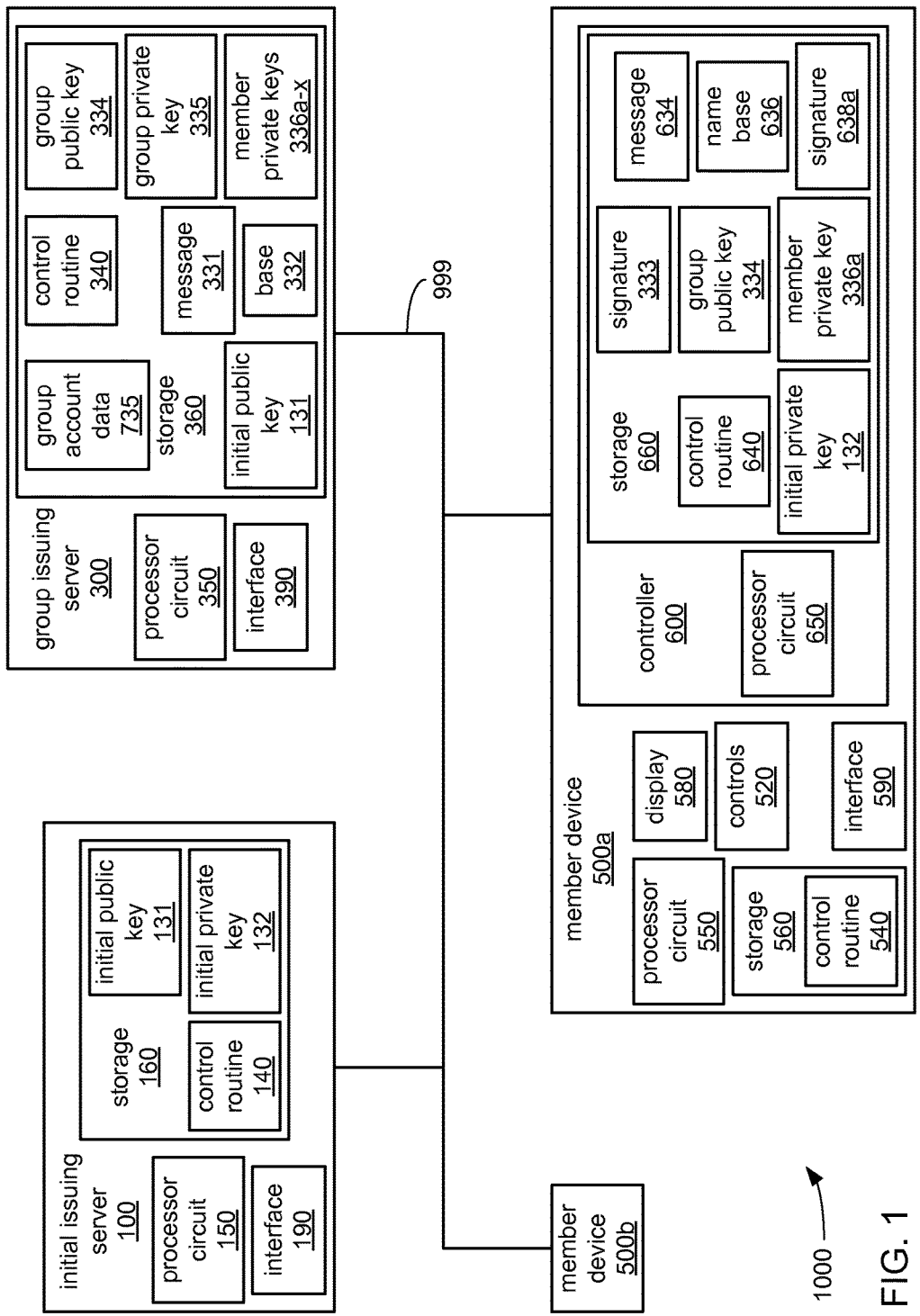
FIGS. 1 and 2 illustrate different portions of a first embodiment of interaction among computing devices.

Various embodiments are generally directed to pairing computing devices for collaborative interaction via a network through a centralized secure device pairing service. More specifically, member devices enabled for collaborative interaction in groups comprise a controller providing a secure operating environment are each provided with an initial private key. Upon being operated to either form or add themselves to a group of member devices, the initial private key is employed in communications with an issuing server to allow that issuing server to authenticate such member devices as incorporating such controllers. Once so authenticated, that issuing generates and/or provides such authenticated member devices with public and private keys associated with that group of member devices.

It is this provisioning of public and private keys associated with that group that effectively "pairs" such member devices with the others already in that group, doing so in a manner that does not require direct interaction with any of the others already in that group. Thereafter, member devices so provided with public and private keys associated with that group are able to authenticate and be authenticated by others of that group, thus allowing collaborative interaction among them while preventing sharing of information associated with a person associated with that group from being shared with other computing devices that are not members of that group.

The issuing server providing the public and private keys associated with that group may be separate from another issuing server that provides the initial private keys to the controllers of those member devices. In such embodiments, that other issuing server also provides an associated initial public key to the issuing server providing the group-related public and private keys to allow that issuing server to authenticate each of the member devices having such a controller provided with an initial private key.

The member devices of that group may also be provided with other information along with the public and private keys associated with that group, that other information comprising one or more forms of "blacklist" or other information enabling revocation of one or more member devices as members of that group. Such information may be recurringly updated by the issuing server that issued those public and private keys in response to one or more member devices having been lost, stolen or otherwise compromised such that it is no longer desired for information to be shared with them.

As those skilled in the art of encryption will readily recognize, any of a variety of cryptosystems may be employed to generate public and private keys, including and not limited to Rivest Shamir Adleman (RSA) and elliptic curve cryptography (ECC). In various cryptosystems, a piece of data referred to as a "message" is digitally signed using a key (could be either a public key or a private key) and another piece of data referred to as a "base." The message and the base may each be practically any piece of data, including and not limited to a random number, a random number pattern, a bit-mapped image, text, an account identifier, etc. However, both the computing device that digitally signs it (thereby turning it into a signature) and the computing device verifying the signature must have access to the message in its original unsigned form. In contrast, the base need not be shared between these two computing devices. However, it may be desirable for the base to be known to both computing devices to further enable the identifying of the computing device that created the digital signature. A "name base" is such a base where the piece of data serving as the base is in some way associated with the computing device that creates the signature (e.g., some sort of name or number serving as identification). A "random base" is made up of randomly generated data, often to add a random element to the signature in a manner that does not prevent verification, but precludes identifying the computing device that created the signature.

In one embodiment, for example, an apparatus comprises a controller processor circuit and a controller storage communicatively coupled to the controller processor circuit to store an initial private key and to store instructions that when executed by the controller processor circuit cause the controller processor circuit to: create a first signature using the initial private key; transmit the first signature to an issuing server via a network; receive a group public key and an associated member private key from the issuing server; create a second signature using the member private key; transmit the second signature to a member device via the network; receive a third signature from the member device; and authenticate the third signature using the group public key. Other embodiments are described and claimed herein.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may comprise a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Figure 2:
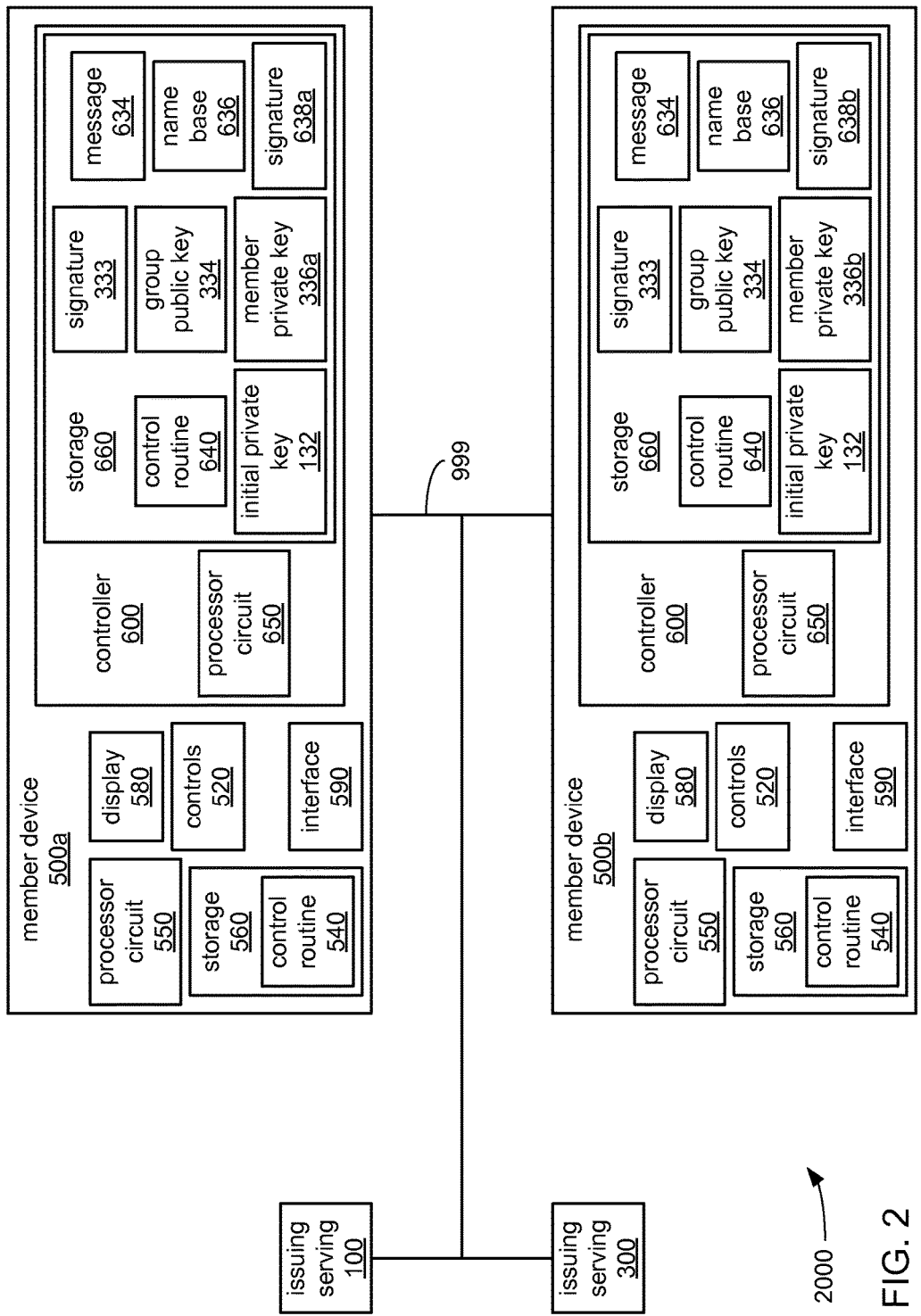

FIGS. 1 and 2, together, illustrate a pair of block diagrams associated with different computing device interactions occurring at different times within a member device pairing system 1000 comprising an initial issuing server 100 operated by an initial certifying authority to issue initial keys, a group issuing server 300 operated by a group certifying authority to issue keys associated with groups, member devices 500a and 500b variously operated to request the formation of a group, to request to be added to that group and to interact with each other to share data. As will be explained in greater detail, initial keys issued by the initial issuing server 100 are provided to the group issuing server 300 and each of the member devices 500a-b to enable the group issuing server 300 to authenticate each of the member device 500a-b, before providing them with keys associated with a group. Thereafter, each of the member devices 500a-b employ the keys associated with that group to authenticate each other before sharing information with each other.

Each of these computing devices 100, 300 and 500a-b may be any of a variety of types of computing device, including without limitation, a desktop computer system, a data entry terminal, a laptop computer, a netbook computer, an ultrabook computer, a tablet computer, a handheld personal data assistant, a smartphone, a digital camera, a mobile device, a body-worn computing device incorporated into clothing, a computing device integrated into a vehicle, a server, a cluster of servers, a server farm, etc.

As depicted, these computing devices 100, 300 and 500a-b exchange signals conveying keys, messages and signatures involved in authentication through a network 999, although one or more of these computing devices may exchange other data entirely unrelated to such authentication. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

Turning to FIG. 1, in various embodiments, the initial issuing server 100 comprises one or more of a processor circuit 150, a storage 160, and an interface 190 coupling the initial issuing server 100 to the network 999. The storage 160 stores one or more of a control routine 140, at least one initial public key 131 and at least one initial private key 132 associated with the initial public key 131. In executing a sequence of instructions of the control routine 140, the processor circuit 150 is caused to generate the initial public key 131 and the initial private key 132. The processor circuit 150 may be further caused by the control routine 140 to transmit at least the initial public key 131 to a group issuing server (e.g., the group issuing server 300) via the network 999, and/or to transmit at least the initial private key 132 via the network 999 to a computing device (not shown) of an entity involved in the manufacture of member devices (e.g., the member devices 500*a* and 500*b*) for incorporation into their controllers. Alternatively, either of these initial keys may be conveyed by other mechanisms than the network 999.

The initial issuing server 100 is operated by an initial certifying authority (a corporation, a government agency, an industry group, etc.) entrusted with issuing initial keys for verification of controllers to be incorporated into member devices during their manufacture as part of enabling their later configuration for use. The initial public key 131 is provided to a group issuing server (e.g., the group issuing server 300) of a group certifying authority (again, a corporation, a government agency, an industry group, etc.) entrusted to create and issue keys associated with one or more groups of member devices. The initial private key 132 is provided to the controllers within each of member devices 500*a-x* (including the member devices 500*a* and 500*b*) to enable authentication by a group issuing server (e.g., the group issuing server 300).

It should be noted that although only the one pair of initial keys is depicted, specifically the initial public key 131 and the initial private key 132, it is envisioned that multiple pairs of initial public and private keys are to be generated by the processor circuit 150 of the initial issuing server 100. It may be that each such pair of initial public and private keys is associated with a different series or family of controllers, and/or a different series or family of member devices into which such controllers are incorporated. Indeed, the initial certifying authority may be a manufacturer of such controllers and/or of such member devices. Accordingly, it is also envisioned that multiple initial public keys, each associated with one of these initial pairs of public and private keys generated for different families or series of controllers and/or member devices, are provided to a group issuing server (e.g., the group issuing server 300) to enable that group issuing server to verify member devices having initial private keys associated with any of those initial public keys.

In various embodiments, the group issuing server 300 comprises one or more of a processor circuit 350, a storage 360 and an interface 390 coupling the group issuing server 300 to the network 999. The storage 360 stores one or more of a control routine 340, the initial public key 131, a message 331, a base 332, at least one group public key 334, at least one group private key 335, member private keys 336*a-x*, and a group account data 735. In executing a sequence of instructions of the control routine 340, the processor circuit 350 is caused to await a request via the network 999 from a member device (e.g., one of the member devices 500*a* or 500*b*) to either form a group of member devices (of which it would be the first member) or add that member device to an existing group of member devices. Upon being so contacted, the processor circuit 350 is caused to employ the initial public key 131, the message 331 and the base 332 to authenticate the contacting member device as incorporating a controller to which public and private keys associated with a group (e.g., the group public key 334 and one of the member private keys 336*a-x*) may be securely provided.

Where the contacting member device requests the formation of a new group in which it is to become the first member, the processor circuit 350 is caused to request an account identifier (account ID), password, identifying details of its operator and/or other information from the contacting member device to enable creation of an account to be associated with the new group; and is caused to store such account-related information within the group account data 735. The processor circuit 350 is then caused by the control routine 340 to generate the group public key 334 and the group private key 335 for that group, and then further caused to employ the group public key 334 and the group private key 335 to generate at least a first one of the member private keys 336*a-x* for the contacting member device. The processor circuit 350 then transmits the group public key 334 and the one of the member private keys 336*a-x* meant for the contacting member device to the contacting member device via the network 999 for secure storage within its controller. It should be noted that it is envisioned that each new group is provided with its own unique set of group public key, group private key and member private keys, although other embodiments are possible in which more than group may share such a set of keys.

Where the contacting member device requests to be added to an existing group, then the processor circuit 350 is also caused to request an account ID and/or password associated with that existing group to verify that the contacting member device is operated by an operator authorized to operate the member device to make such a request. The processor circuit 350 compares what is received in response to the request for an account ID and/or password to what is stored in the group account data 735 as part of this verification. Presuming that the contact member device is authenticated as having the necessary form of controller, and presuming that authorization to add it to an existing group is verified, a member private key unique to the contacting member device is generated from the group public key and the group private key associated with that requested existing group. The processor circuit 350 is then caused to transmit that group public key and that member private key via the network 999 to that contacting member device (presuming the group is associated with the group public key 334, the group private key 335 and the member private keys 330*a-x*, then the group public key 334 and a unique one of the member private keys 330*a-x* would be transmitted to that contacting member device).

The group issuing server 300 is operated by a group certifying authority entrusted with issuing keys for mutual verification of member devices belonging to groups formed and overseen by that group certifying authority. Although it may be that a group certifying authority may operate the group issuing server 300 to issue keys and maintain accounts to do little more than to enable the pairing of member devices through the group issuing server 300 to form groups of member devices, it is envisioned that the accounts and their associated groups may also be associated with various services provided by that group certifying authority for each of the groups of devices that it oversees through the group issuing server 300. By way of example, the group certifying authority may provide online data storage services tied to each account to provide secure data storage for each group that enables all of the member devices within a given group to have access to a common storage space provided by the group issuing server 300 (and/or through another server associated with the group issuing server 300). By way of another example, the group certifying authority may provide email and/or instant messaging services tied to each account such that all member devices of a group (all of which may be associated with one person) are provided access to an email service configured to ensure that the current state of an email address is synchronized across all of those member devices. By way of still another example, the group certifying authority may provide book club and/or music purchasing services tied to each account such that all member devices of a group are given shared access to whatever electronic books and/or electronic copies of music that are purchased through that account.

It should also be noted that although the initial issuing server 100 and the group issuing server 300 are depicted and described as entirely separate, and are described as maintained by separate issuing authorities, other embodiments are possible in which a single issuing server operated by a single issuing authority provides the functions of both of these issuing servers. By way of example, it may be that a manufacturer of controllers and/or of member devices also seeks to provide member device pairing services in the manner described herein.

In various embodiments, the member device 500a comprises one or more of a processor circuit 550, a storage 560, controls 520, a display 580, an interface 590 coupling the member device 500 to the network 999, and a controller 600. The storage 560 stores a control routine 540. The controller 600 comprises a processor circuit 650 and a storage 660. The storage 660 stores one or more of a control routine 640, the initial private key 132, a signature 333 (when generated), the group public key 334, a member private key 336a, a message 634, a name base 636 and a signature 638a (when generated). In executing a sequence of instructions of the control routine 540, the processor 550 is caused to await a signal indicating operation of the controls 520 (or a signal from some other source) indicating operation of the member device 500a, and then to operate the interface 590 to signal a group issuing server (e.g., the group issuing server 300) via the network 999 to request either to form or to join a group of member devices. Upon making contact with a group issuing server, the processor circuit 550 is caused to signal the controller 600 to engage in communications with that group issuing server to authenticate the member device 500a as having the requisite form of controller for secure storage and use of public and private keys associated with a group.

The controller 600, with the processor circuit 650 executing at least the control routine 640 in its role as a controller processor circuit, defines an operating environment that is substantially isolated from the main operating environment defined within much of the rest of the member device 500a by at least the processor circuit 550 executing the control routine 540 in its role as a main processor circuit. More specifically, the processor circuit 550 may be provided with limited or no access to the storage 660 and/or other components within the controller 600, thereby preventing unauthorized access to at least the control routine 640 (either as stored in the storage 660 or as executed by the processor circuit 650), or to at least some of the keys stored within the storage 660 in unencrypted or otherwise unprotected form (including at least the initial private key 132). The controller 600 may be implemented with any of various forms of digital logic and/or executable sequences of instructions. Further, the controller 600 may be incorporated into a larger set of digital logic that also implements other components of the member device 500a (e.g., a chipset implementing much of the digital logic of the member device 500a).

In executing a sequence of instructions of the control routine 640, the processor circuit 650 is caused to receive the signal from the processor circuit 550 to authenticate the member device 500a as having the requisite form of controller to a group issuing server (e.g., the group issuing server 300) by first operating the interface 590 to reach agreement with the group issuing server as to a message and a base to be used in such authentication. A group issuing server may agree to the use of a message and/or a base provided by the member device 500a (in which case, the processor circuit 650 would transmit copies of them to that group issuing server) or a group issuing server may require the use of a message and/or a base that it provides (in which case, the processor circuit 650 would receive them from that group issuing server).

As depicted and has been discussed, the group issuing server 300 stores a message 331 and a base 332 within the storage 360. Presuming that the group issuing server 300 is the one that was contacted by the member device 500a, the group issuing server 300 may require the member device 500a to employ the message 331 and the base 332 in this authentication. Thus, the processor circuit 650 would receive the message 331 and the base 332 from the group issuing server 300, use the initial private key 132 and the base 332 to digitally sign the message 331 to create the signature 333, and then transmit the signature 333 back to the group server 300. Presuming that authentication of the member device 500a as incorporating the controller 600 is successful, the group issuing server 300 would then signal the member device 500a with a request for further information as part of either creating a new group or adding the member device 500a to an existing one.

As previously discussed, where the group issuing server 300 is contacted by the member device 500a with a request to form a new group of member devices, the group issuing server 300 requests various pieces of information (e.g., an account ID, a password, other identifying information of the operator of the member device 500a, etc.) to create an account as part of creating a group. Then, a group public key and a group private key (e.g., the group public key 334 and the group private key 335) are generated by the issuing server 300, and then used by the issuing server 300 to generate at least a first member private key of what is to be a multitude of member private keys (e.g., the member private keys 336a-x). Alternatively, where the group issuing server 300 is contacted by the member device 500a with a request to be added to an existing group of member devices, the group issuing server 300 requests such information as an account ID and/or a password to verify that the operator of the member device 500a is authorized to add member devices to that group. Presuming such verification is successful, a group public key and a group private key (e.g., the group public key 334 and the group private key 335) are used to generate a new member private key (e.g., one of the member private keys 336a-x).

Regardless of whether the member device 500a was operated to contact the group issuing server 300 with a request to form a new group or to add the member device 500a to an existing one, the processor circuit 550 is caused to receive these requests from the group issuing server 300 for such information as an account ID and/or password, and in response, is caused to present such requests to the operator of the member device 500a (possibly visually via the display 580, or in some other way, such as synthesized voice), and to await a response from the operator. Presuming the operator responds to such a request, the processor circuit 550 is caused to receive a signal indicative of operation of the controls 520 and/or a response from the operator provided in some other way, and the processor circuit 550 is then further caused to signal the group issuing server 300 with the operator's response. Presuming that the operator's response is accepted by the group issuing server 300, and presuming that the group that was created or to which the member device 500a was added is associated with the depicted group public key 334, the group private key 335 and the member private keys 336a-x, the processor circuit 650 is caused to receive the member private key 336a (one of the member private keys of the set of member private keys 336a-x generated by the group issuing server 300) and to store it within the storage 660. The processor circuit 650 is then further caused to signal the processor circuit 550 with an indication that keys associated with the group have been successfully received from the group issuing server 300.

Turning to FIG. 2, in various embodiments, the member device 500b comprises substantially the same or similar components as the member device 500a. For sake of simplicity of discussion and understanding, like components of the member devices 500a and 500b are given like reference numerals. Also, for sake of ease of discussion, it is presumed that each of the member devices 500a and 500b has been operated to contact the group issuing server 300 to form and/or join the same group, and that group is associated with the group public key 334, the group private key 335 and the member private keys 336a-x. Thus, the member devices 500a and 500b have each been given their unique member private keys 336a and 336b, respectively, as well as each having been given copies of the same group public key 334 by the group issuing server 300 via the network 999.

As has been discussed, the member devices 500a and 500b may both be operated by a single individual as members of a group of devices that this one individual seeks to use together in a collaborative manner such that this one individual desires that the member devices within that group at least cooperate to share data among them. As has also been discussed, a prerequisite to such data sharing is that each of the member devices that are about to do so must first authenticate the other. The provision of the group public key 334 and the member private keys 336a and 336b to corresponding ones of the member devices 500a and 500b enables these two member devices to perform such mutual authentication as a precursor to sharing data between them.

Thus, within each of the member devices 500a and 500b, corresponding ones of the processor circuit 550 monitor their corresponding ones of the interface 590 awaiting indications of detecting what may be another member device belonging to a common group of member devices. Upon detecting one another, the processor circuits 550 of each of the member devices 500a and 500b signal corresponding ones of the controller 600 to authenticate the other of the member devices 500a and 500b. Upon receiving their signals from the corresponding ones of the processor circuits 550, the processor circuits 650 of each of the controllers 600 operate their respective ones of the interface 590 to communicate with each other to authenticate each other.

As depicted, the storage 660 of each of the controllers 600 is depicted as storing the same message 634 and the same name base 636. It may be that both were provided with the same message and base to use in authenticating each other by the group issuing server 300, along with the group public key 334 and their corresponding member private keys 336a and 336b. Alternatively, it may be the processor circuits 650 of each of member devices 500a and 500b exchanged the message 634 and the name base 636 as part of negotiating as to what message and what base are to be used by each. Regardless, the processor circuit 650 of the member device 500a uses its member private key 336a and the name base 636 to digitally sign the message 634, thereby creating the signature 638a. Correspondingly, the processor circuit 650 of the member device 500b uses its member private key 336b and the name base 636 to digitally sign the message 634, thereby creating the signature 638b. Each of these processor circuits 650 then operates its corresponding one of the interface 590 to transmit its corresponding one of the signatures 638a and 638b to the other via the network 999. Then, each of the processor circuits 650 is caused to use the group public key 334 to verify the signature it receives.

Presuming each is able to authenticate the signature of the other, the two member devices 500a and 500b are then successfully authenticated to each other as devices between which data may be shared. The processor circuit 650 of each controller 600 signals its corresponding processor circuit 550 to the effect that the other of the member devices 500a and 500b has been authenticated such that data may be shared with that other member device.

In various embodiments, each of the processor circuits 150, 350, 550 and 650 may comprise any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor circuits may comprise a multi-core processor (whether the multiple cores coexist on the same or separate dies), and/or a multi-processor architecture of some other variety by which multiple physically separate processors are in some way linked.

In various embodiments, each of the storages 160, 360, 560 and 660 may be based on any of a wide variety of information storage technologies, possibly including volatile technologies requiring the uninterrupted provision of electric power, and possibly including technologies entailing the use of machine-readable storage media that may or may not be removable. Thus, each of these storages may comprise any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may comprise multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 190, 390 and 590 employ any of a wide variety of signaling technologies enabling each of computing devices 100, 300 and 500 to be coupled through the network 999 as has been described. Each of these interfaces comprises circuitry providing at least some of the requisite functionality to enable such coupling. However, each of these interfaces may also be at least partially implemented with sequences of instructions executed by corresponding ones of the processor circuits 150, 350, 550 and 650 (e.g., to implement a protocol stack or other features). Where one or more portions of the network 999 employs electrically and/or optically conductive cabling, corresponding ones of the interfaces 190, 390 and 590 may employ signaling and/or protocols conforming to any of a variety of industry standards, including without limitation, RS-232C, RS-422, USB, Ethernet (IEEE-802.3) or IEEE-1394. Alternatively or additionally, where one or more portions of the network 999 entails the use of wireless signal transmission, corresponding ones of the interfaces 190, 390 and 590 may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although each of the interfaces 190, 390 and 590 are depicted as a single block, one or more of these may comprise multiple interfaces that may be based on differing signaling technologies. This may be the case especially where one or more of these interfaces couples corresponding ones of the computing devices 100a-b, 300, 500 and 700 to more than one network, each employing differing communications technologies.

Figure 3:
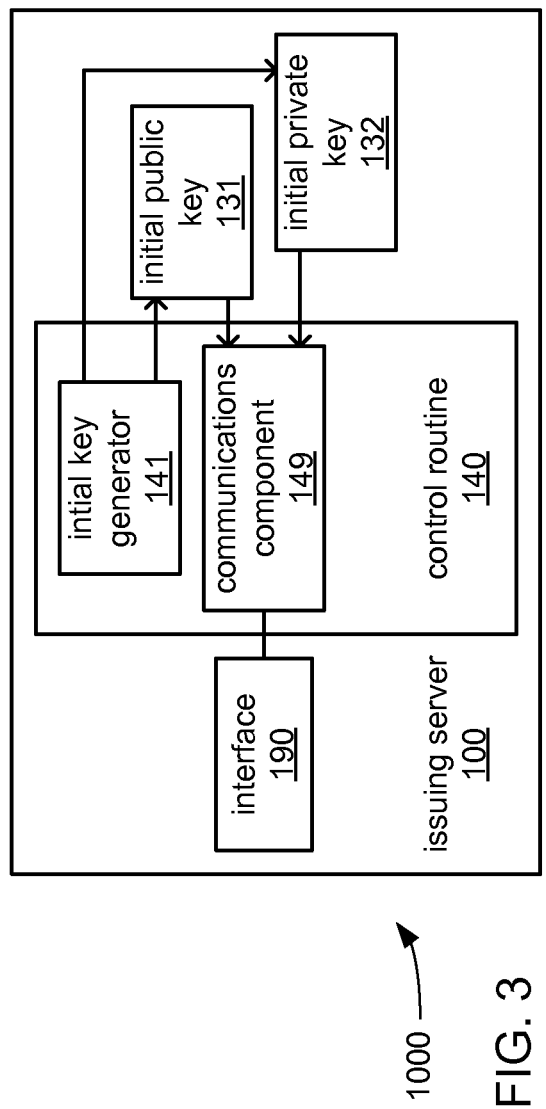
FIG. 3 illustrates a portion of the embodiment of FIGS. 1 and 2.
Figure 4:
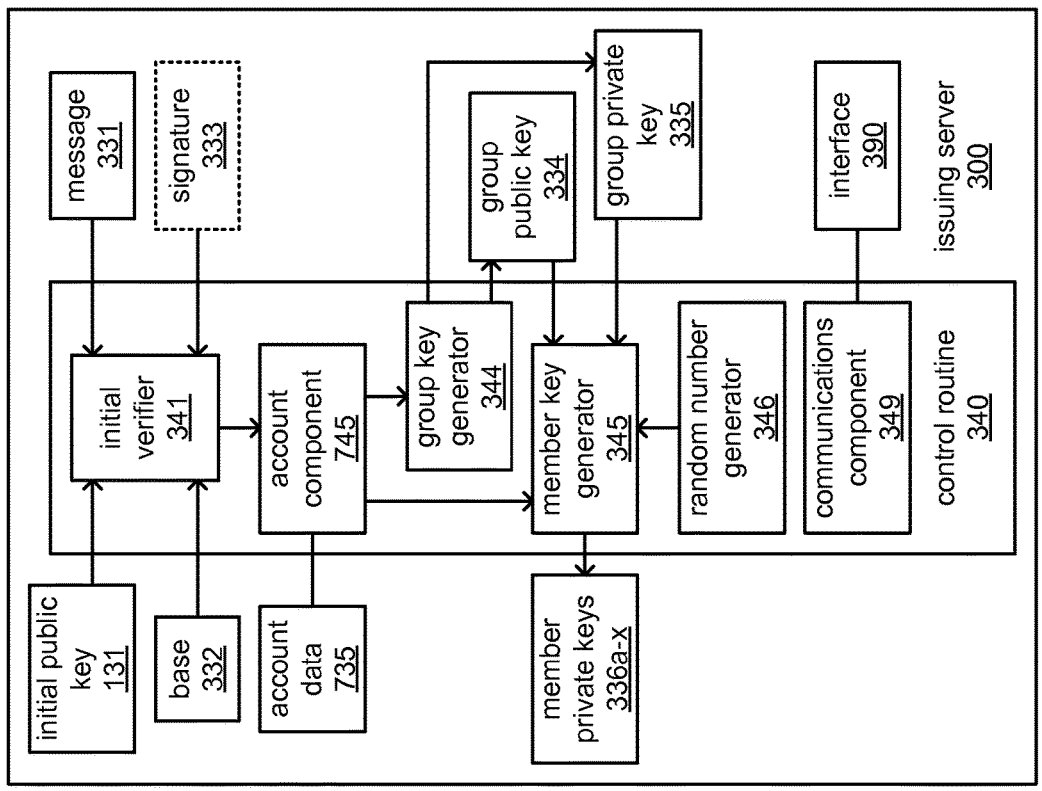
FIG. 4 illustrates a portion of the embodiment of FIGS. 1 and 2.
Figure 5:
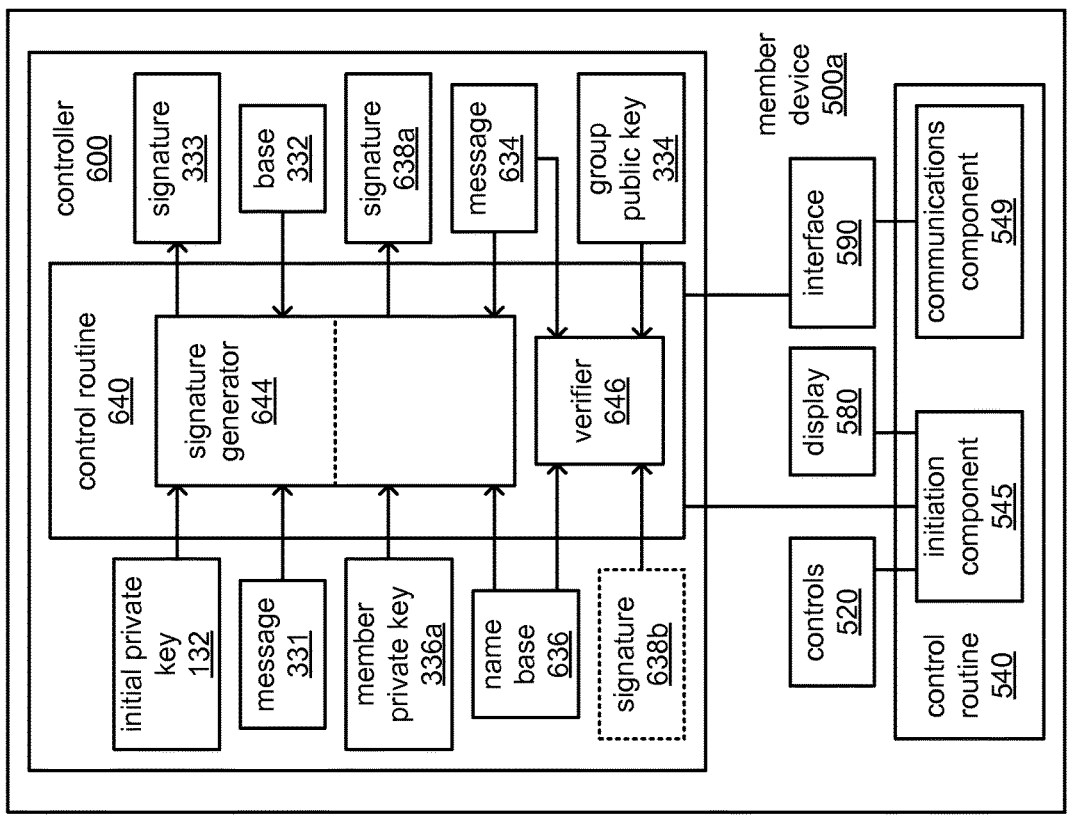
FIG. 5 illustrates a portion of the embodiment of FIGS. 1 and 2.

FIGS. 3, 4 and 5, taken together, illustrate block diagrams of portions of the block diagram of FIG. 1 depicted in greater detail. More specifically, aspects of the operating environments of the computing devices 100, 300 and 500, as well as the controller 600, are depicted, in which corresponding ones of the processor circuits 150, 350, 550 and 650 (FIG. 1) are caused by execution of respective control routines 140, 340, 540 and 640 to perform the aforedescribed functions. As will be recognized by those skilled in the art, each of the control routines 140, 340, 540 and 640, including the components of which each is composed, are selected to be operative on whatever type of processor or processors that are selected to implement each of the processor circuits 150, 350, 550 and 650.

In various embodiments, one or more of the control routines 140, 340, 540 and 640 may comprise a combination of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor circuits 150, 350, 550 and 650, including without limitation, Windows™, OS X™, Linux®, or Android OS™. Where one or more device drivers are included, those device drivers may provide support for any of a variety of other components, whether hardware or software components, that comprise one or more of the computing devices 100, 300 and 500.

Each of the control routines 140, 340 and 540 comprises a communications component 149, 349 and 549, respectively, executable by corresponding ones of the processor circuits 150, 350 and 550 to operate corresponding ones of the interfaces 190, 390 and 590 to transmit and receive signals via the network 999 as has been described. As will be recognized by those skilled in the art, each of these communications components are selected to be operable with whatever type of interface technology is selected to implement each of the corresponding ones of these interfaces.

Turning more specifically to FIG. 3, the control routine 140 comprises an initial key generator 141 executable by the processor circuit 150 to generate the initial public key 131 and the initial private key 132. As has been depicted and discussed, the same initial private key 132 is provided to the controller 600 in each of the member devices 500a and 500b. However, alternate embodiments are possible in which a further key generation component (not shown) employs the initial public key 131 and the initial private key 132, possibly along with a random number generator (depending, at least in part, on the cryptosystem used), to generate multiple initial member private keys (also not shown) to enable the provision of a unique initial member private key to the controller 600 of each of the member devices 500a and 500b, instead of a common one.

As depicted and has been discussed, the initial public key 131 and the initial private key 132 are then transmitted from the initial issuing server 100 via the interface 190 to other computing devices via the network 999. However, as has also been discussed, the initial public key 131 may be provided to one or more group issuing servers (e.g., the group issuing server 300), and initial private key 132 may be provided to the controllers of member devices (e.g., the controller 600 of member devices 500a-b) by other mechanisms as either the controllers or the member devices are manufactured.

Turning more specifically to FIG. 4, the control routine 340 comprises an initial verifier 341 to receive the signature 333 from a member device (e.g., the one of the member devices 500a-b) that is created by that member device signing the message 331 with the initial private key 132 and the base 332, the message 331 and the base 332 having been sent to that member device by the issuing server 300, as has been previously discussed.

The control routine 340 comprises an account component 745. In response to successful authentication of the controller of that member device and a request received from that member device to create a new group of member devices, the account component 745 requests information required to create an account (e.g., an account ID, a password, identifying information of an operator of that member device, etc.), and stores that information in the group account data 735 as part of creating a new account for the new group. Also in response to the request to create a new group, the account component 745 signals other components of the control routine 340 to generate a new set of keys that will be associated with the new group. Alternatively, in response to successful authentication of the controller of that member device and a request received from that member device to be added to an existing group of member devices, the account component 745 requests information required to verify that the operator of that member device is authorized to add member devices to that group (e.g., an account ID, a password, etc.), and accesses information in the group account data 735 for the account associated with that group to verify the correctness of that operator's response to the request for that information. Also in response to the request to add that member device to an existing group, and presuming that the operator is verified as having authority to add member devices to that group, the account component 745 signals another component of the control routine 340 to generate a member private key for that member device.

The control routine 340 comprises a group key generator 344 to generate a related pair of a group public key and a group private key (e.g., the group public key 334 and the group private key 335) in support of creating a new group of member devices, as signaled by the account component 745. The control routine 340 further comprises a member key generator 345 to create member private keys (e.g., the member private keys 336a-x) that are unique to each member device of a group of member devices, whether that group is a newly created group or one that already exists with one or more member devices already part of it. Depending on the cryptosystem used and/or the desired approach to generating unique member private keys, the control routine 340 may also comprise a random number generator 346 to provide random numbers to the member key generator 345.

Turning more specifically to FIG. 5, the control routine 540 comprises an initiation component 545 employing various components of the member device 500a to interact with an operator of the member device 500a, including receiving signals indicative of operation of the controls 520 (or signals emanating from some other component of the member device 500a) to initiate contact via the interface 590 and the network 999 with a group issuing server (e.g., the group issuing server 300) to either create a new group of member devices of which the member device 500a is to be a member or to add the member device 500a to an existing group of member devices. Upon contact being made with a group issuing server, the controller 600 is contacted to communicate with the group issuing server to verify the controller 600 to that group issuing server.

The routine 640 comprises a signature generator 644 to digitally sign messages using private keys and bases, thereby creating signatures for transmission to other computing devices for authentication. Upon initial contact with a group issuing server, and presuming for ease of discussion that the group issuing server contacted in this case is the group issuing server 300, the signature generator 644 digitally signs the message 331 provided by the group issuing server 300 using the initial private key 132 (generated at an earlier time by the initial issuing server 100, as previously discussed) and using the base 332 also provided by the group issuing server 300 to create the signature 333. The signature 333 is then transmitted via the interface 590 back to the group issuing server 300 for authentication.

As previously discussed, in other possible embodiments, the initial issuing server 100 may issue unique initial member private keys to each of the member devices 500a and 500b, instead of the common initial private key 132, and this would have resulted in each signature created by each of the member devices 500a and 500b using the keys provided by the initial issuing server 100 being unique. As has also been previously discussed, though the group issuing server 300 has been described as providing the message 331 and the base 332, it may, instead, be the case that the member device 500a provides the message and/or the base, which the member device 500a would then provide to the group issuing server 300 for use in authenticating the signature 333. It may be that the message 331 and/or the base 332 comprise data associated with the account associated with the group to be created or to be joined by the member device 500a. Specifically, the base 332 may be a name base (versus a randomly generated one) that may comprise an account ID or other account-related information.

Presuming successful authentication by the group issuing server 300 of the member device 500a as having the controller 600 and of the controller 600 being of a type deemed secure enough to provide with keys associated with a group, the group issuing server 300 then signals the member device 500a to present its operator with a request for information to be used by the issuing server 300 to either create a new account to be associated with a new group or to verify that the operator is authorized to add the member device 500a to an existing group. In response to this request, the initiation component 545 acts to present that request to the operator of the member device 500a (possibly visually on the display 580, audibly, and/or in some other manner), and then awaits signals conveying input provided by the operator (e.g., signals from operator use of the controls 520 and/or other signals indicative of a response to the request). The initiation component 545 then transmits that response back to the group issuing server 300.

Presuming a correct response from the operator, the group issuing server 300 acts to fulfill the request made by the operator via the initiation component 545 to either create an entirely new group of which the member device 500a is to be the first member or to add the member device 500a to an existing group. Regardless of which request was made, the group issuing server 300 provides the member device 500a with the group public key 334 generated by the group issuing server 300 for the group, and the member private key generated by the group issuing server 300 specifically for the member device 500a. The initiation component 545 is then signaled by the controller 600 to the effect that public and private keys associated with a group have been received. As previously discussed, the group issuing server 300 may also provide the message 634 and the name base 636. Again, in alternate embodiments, the message 634 and/or the name base 636 may be provided and/or created in any of a variety of other ways.

With the provision of at least the group public key 334 and the member private key 336a to the member device 500a, the controller 600 is able to engage in authenticating other member devices in the same group and is able to assist in causing the member device 500a to be authenticated by other member devices in the same group. Upon contact with the member device 500b, and presuming for ease of discussion that the group includes at least both of the member devices 500a and 500b, the signature generator 644 uses the member private key 336a and the name base 636 (agreed to by both member devices by whatever mechanism) to digitally sign the message 634 (also agreed to by both member devices by whatever mechanism), thereby creating the signature 638a which is transmitted to the member device 500b. Presuming that the member device 500b authenticates the signature 638a, then the member device 500a is authenticated to receive data from the member device 500b.

The routine 640 also comprises a verifier 646 that uses the group public key 334, along with the agreed upon message 634 and name base 636, to verify a signature 638b generated by and received from the member device 500b. Presuming that the member device 500a authenticates the signature 638b, then the member device 500b is authenticated to receive data from the member device 500a. It should be noted that in exchanging data, the group public key 334, along with the member private keys 336a and 336b, may be also be used to encrypt and decrypt the transferred data in any of a number of possible ways that those skilled in the art of encryption will readily recognize.

Figure 6:
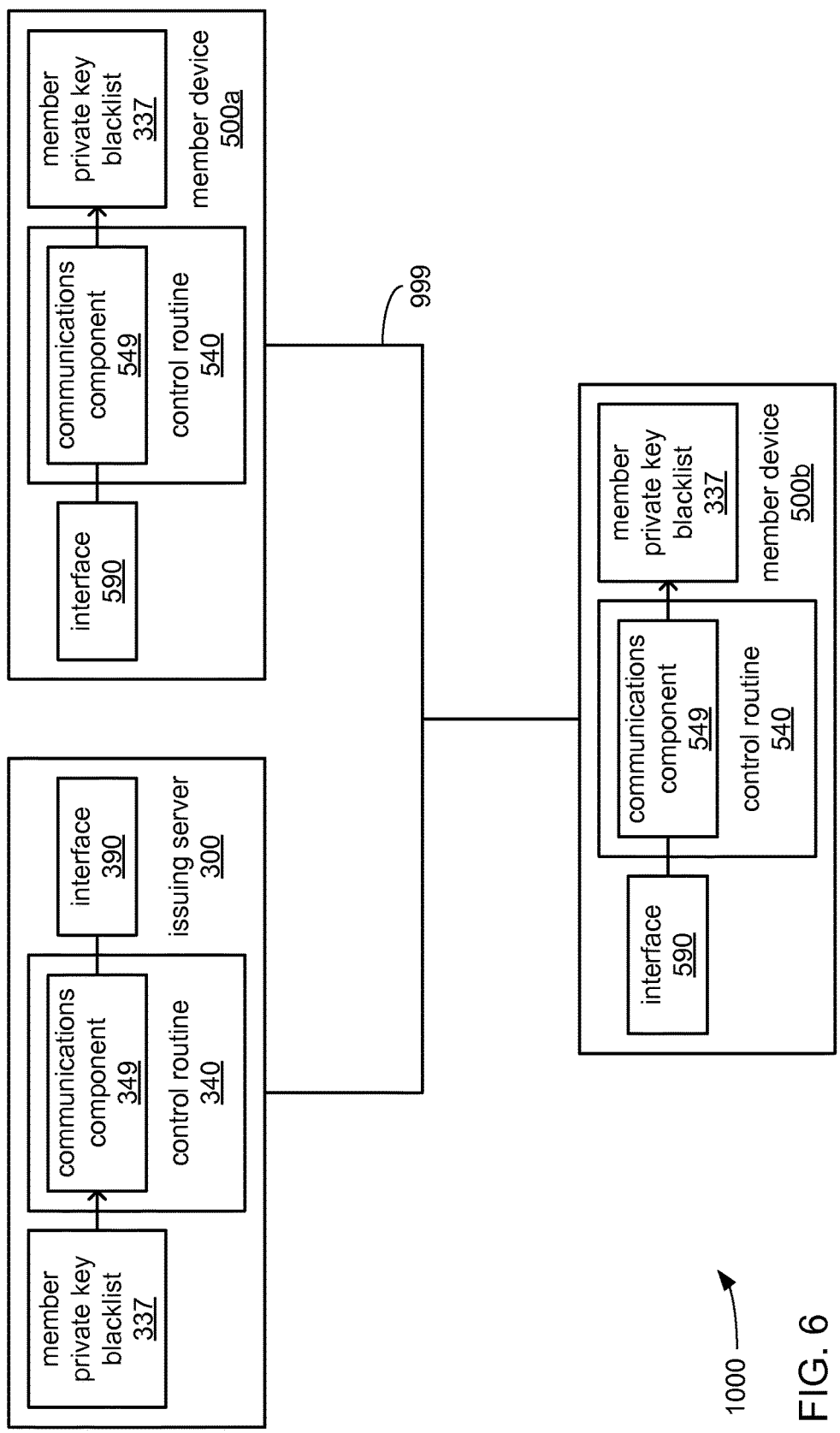
FIG. 6 illustrates a portion of the embodiment of FIGS. 1 and 2.

FIG. 6 illustrates a block diagram associated with a further computing device interaction occurring within the member device pairing system 1000 comprising the provision of a member private key blacklist 337 to each of the member devices 500*a-b* as part of implementing one or more mechanisms of revoking membership by one or more member devices in a group. Different techniques of revocation may be possible depending, at least in part, on what cryptosystem is used.

Although deemed unlikely, it may be that either the group private key 335 or enough of the member private keys 336*a-x* have been compromised that it is deemed desirable to revoke all keys associated with the group, possibly in preparation for issuing an all new set of group public and private keys, and member private keys. This form of revocation is commonly referred to as "group-based revocation." To perform group-based revocation, the group issuing server 300 simply signals each of the member devices in a group (e.g., the member devices 500*a-b*) to the effect that the group public key 334 is no longer valid. Subsequently, each of those member devices may then be issued a new group public key and new member private keys.

Although also deemed unlikely, it may be that one of the member private keys 336*a-x* issued to a member device (e.g., one of the member devices 500*a* or 500*b*) has somehow been compromised such that it is deemed desirable to revoke it by providing the other member devices of the same group with a member private key blacklist (e.g., the member private key blacklist 337) against which each member device is to compare member private keys of other member devices of the group that they subsequently encounter. This form of revocation is commonly referred to as "private key-based revocation."

Still other forms of blacklisting and/or other revocation techniques will occur to those skilled in the art.

Figure 7:
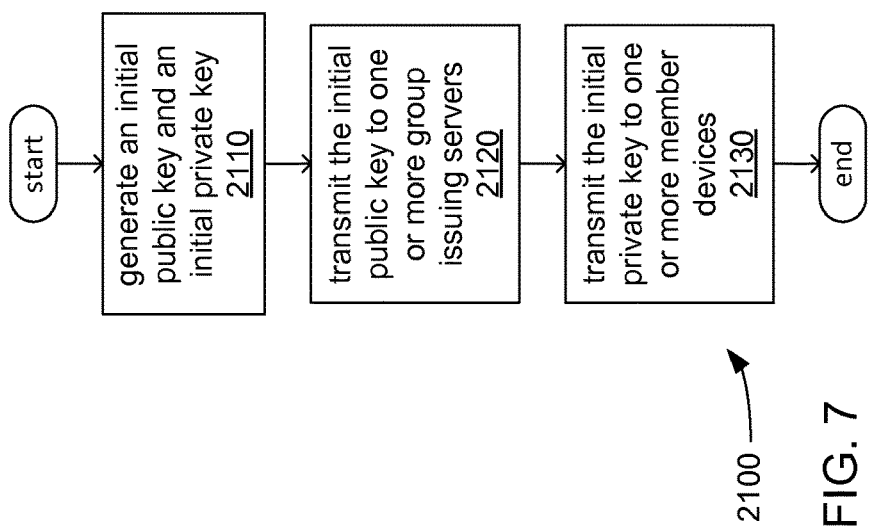
FIG. 7 illustrates an embodiment of a first logic flow.

FIG. 7 illustrates one embodiment of a logic flow 2100. The logic flow 2100 may be representative of some or all of the operations executed by one or more embodiments described herein. More specifically, the logic flow 2100 may illustrate operations performed by the processor circuit 150 of the initial issuing server 100 in executing at least the control routine 140.

At 2110, an initial issuing server (e.g., the initial issuing server 100) generates an initial public key (e.g., the initial public key 131) and an initial private key (e.g., the initial private key 132). As has been discussed, in some alternate embodiments, an initial issuing server may further create initial member private keys from the initial public and initial private keys.

At 2120, the initial issuing server transmits the initial public key to one or more group issuing servers (e.g., the group issuing server 300). As has been discussed, in some alternative embodiments, the functions of an initial issuing server and a group issuing server may be combined into a single issuing server, thereby possibly precluding the need to transmit the initial public key, at all.

At 2130, the initial issuing server transmits the initial private key to one or more member devices (or in alternate embodiments, transmits a separate and unique initial member private keys to each member device). As has been discussed, the initial private key may be provided to member devices by another mechanism, especially where the initial private key is provided to member devices at the time of their manufacture and/or to their controllers at the time of manufacture of those controllers.

Figure 8:
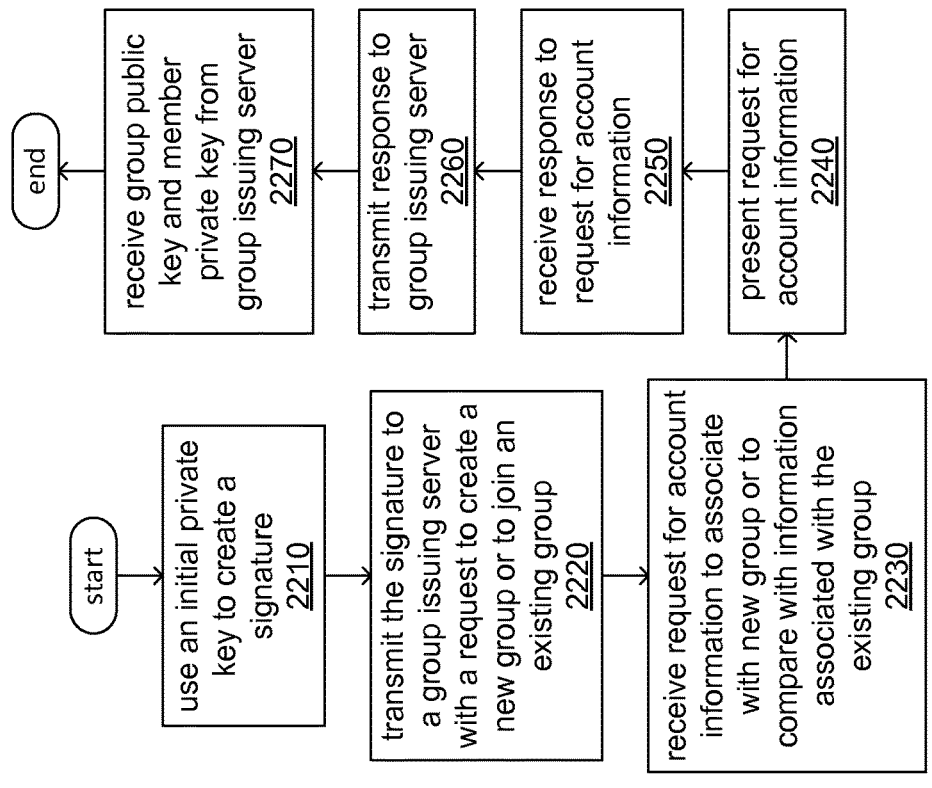
FIG. 8 illustrates an embodiment of a second logic flow.

FIG. 8 illustrates one embodiment of a logic flow 2200. The logic flow 2200 may be representative of some or all of the operations executed by one or more embodiments described herein. More specifically, the logic flow 2200 may illustrate operations performed by the processor circuits 550 and 650 of one of the member devices 500*a* or 500*b* in executing at least the control routines 540 and 640.

At 2210, a member device (e.g., the member device 500*a* or 500*b*) uses an initial private key (e.g., the initial private key 132) to create a signature (e.g., the signature 333). As has been discussed, if each member device were given a unique initial member private key instead of a common initial private key, then these signatures would each be unique, as well.

At 2220, the member device transmits the signature to a group issuing server. The member device accompanies the signature with a request to either create a new group of member devices (of which the member device would be the first member) or to add the member device to an existing group of member devices.

At 2230, the member device receives a request from the group issuing server for account information to either create an account to be associated with the new group of member devices, or to compare to existing account information associated with the existing group of member devices to verify that the operator of the member device is authorized to add member devices to that existing group. As has been discussed, such information may include information identifying the operator of the member device (such as a name, etc.) or may include a simple combination of an account identifier (ID) and a password (or other similar types of information).

At 2240, the member device presents this request for information to the operator of the member device. As has been discussed, this presentation may be made visually (e.g., via the display 580) and/or may be made in other ways (e.g., audibly, etc.).

At 2250, a processor circuit of the member device (e.g., the processor circuit 550) receives signals indicative of a response by the operator of the member device to the request for information. As has been discussed, the received signals may be indicative of manual operation of manually-operable controls (e.g., the controls 520) and/or of some other component of the member device by which an operator's response may be received.

At 2260, the member device transmits the operator's response to the request for information to the group issuing server, and receives a group public key and a member private key from the group issuing server at 2270.

Figure 9:
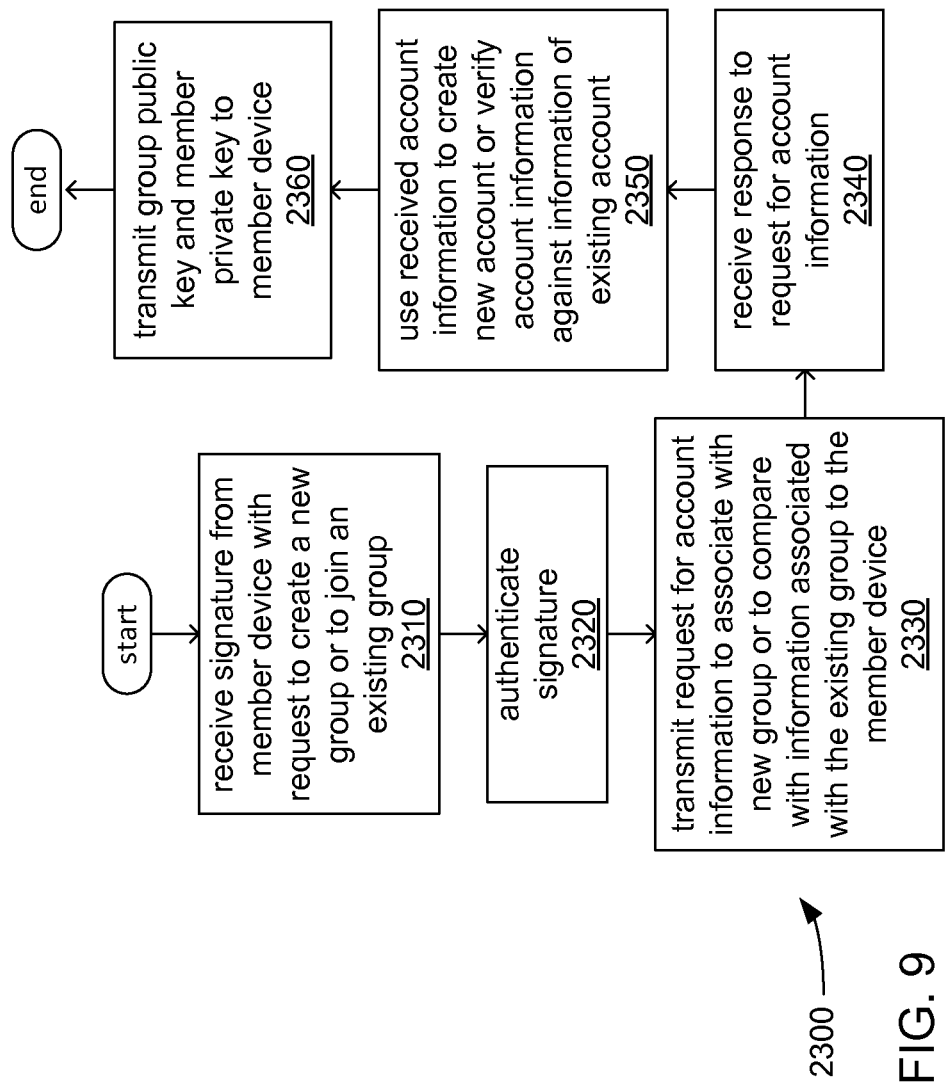
FIG. 9 illustrates an embodiment of a third logic flow.

FIG. 9 illustrates one embodiment of a logic flow 2300. The logic flow 2300 may be representative of some or all of the operations executed by one or more embodiments described herein. More specifically, the logic flow 2300 may illustrate operations performed by the processor circuit 350 of the group issuing server 300 in executing at least the control routine 340.

At 2310, a group issuing server (e.g., the group issuing server 300) receives a signature (e.g., the signature 333) from a member device (e.g., the member device 500*a* or 500*b*) created using an initial private key (e.g., the initial private key 132). The member device accompanies the signature with a request to either create a new group of member devices (of which the member device would be the first member) or to add the member device to an existing group of member devices. As has been discussed, if each member device were given a unique initial member private key instead of a common initial private key, then these signatures would each be unique, as well.

At 2320, the group issuing server authenticates the signature using an initial public key (e.g., the initial public key 131). As previously discussed, the group issuing server 300 receives the initial public key 131 from an initial issuing server, such as the initial issuing server 100, at an earlier time. Alternatively, the functions of both issuing servers may be incorporated into a single issuing server such that the single issuing server would generate this initial public key itself.

At 2330, the group issuing server transmits a request to the member device for account information to either create an account to be associated with the new group of member devices, or to compare to existing account information associated with the existing group of member devices to verify that the operator of the member device is authorized to add member devices to that existing group. As has been discussed, such information may include information identifying the operator of the member device (such as a name, etc.) or may include a simple combination of an account identifier (ID) and a password (or other similar types of information).

At 2340, the group issuing server receives a response to its request for account information from the member device, and then uses the account information received in that response to either create a new account to be associated with a new group or to compare the account information received in that response to account information stored by the group issuing server that is associated with the existing group to verify that the operator of the member device has the authority to add the member device to that existing group at 2350.

At 2360, the group issuing server transmits a group public key and a member private key to the member device. The initial private key may be employed in encryption and/or another mechanism to provide security for this transmission. As has been discussed, the group issuing server generates the member private key from both the group public key and an associated group private key, as well as possibly a randomly generated number depending on the cryptosystem used.

Figure 10:
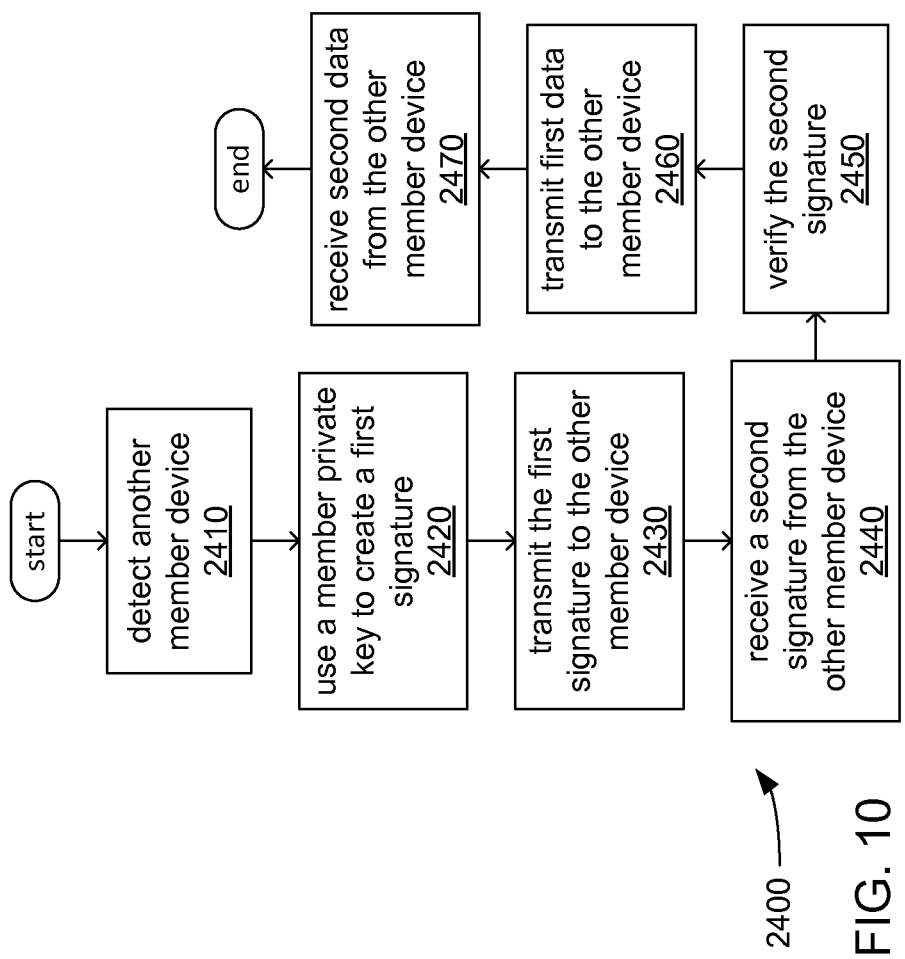
FIG. 10 illustrates an embodiment of a fourth logic flow.

FIG. 10 illustrates one embodiment of a logic flow 2400. The logic flow 2400 may be representative of some or all of the operations executed by one or more embodiments described herein. More specifically, the logic flow 2400 may illustrate operations performed by one of the processor circuits 550 or 650 of one of the member devices 500*a* or 500*b* in executing at least the control routine 540 or 640.

At 2410, a member device (e.g., the member device 500*a* or 500*b*) detects another member device (e.g., the other of the member devices 500*a* or 500*b*). In response to this detection, at 2420, the member device uses a member private key associated with a group to generate a first signature. As has been discussed, such use of keys would occur within an isolated operating environment of a controller within the member device (e.g., the controller 600) to ensure security.

At 2430, the member device transmits the first signature to the other member device, and at 2440, the member device receives a second signature from the other member device. As has been discussed, it is envisioned that the controller would directly engage in transmission and reception of keys and signature to ensure security.

At 2450, the member device verifies the second signature, thereby authenticating the other member device as belonging to the same group such that the other member device is authorized to receive data from the member device. In response, the member device transmits first data to the other member device at 2460. As previously discussed, the controller of the member device signals a main processor circuit (e.g., the processor circuit 550) of the member device that the other member device has been verified as being authorized to receive data.

At 2470, the member device receives second data from the other member device. A presumption is made that the other member device would not do so unless it had successfully verified the second signature sent to it.

Figure 11:
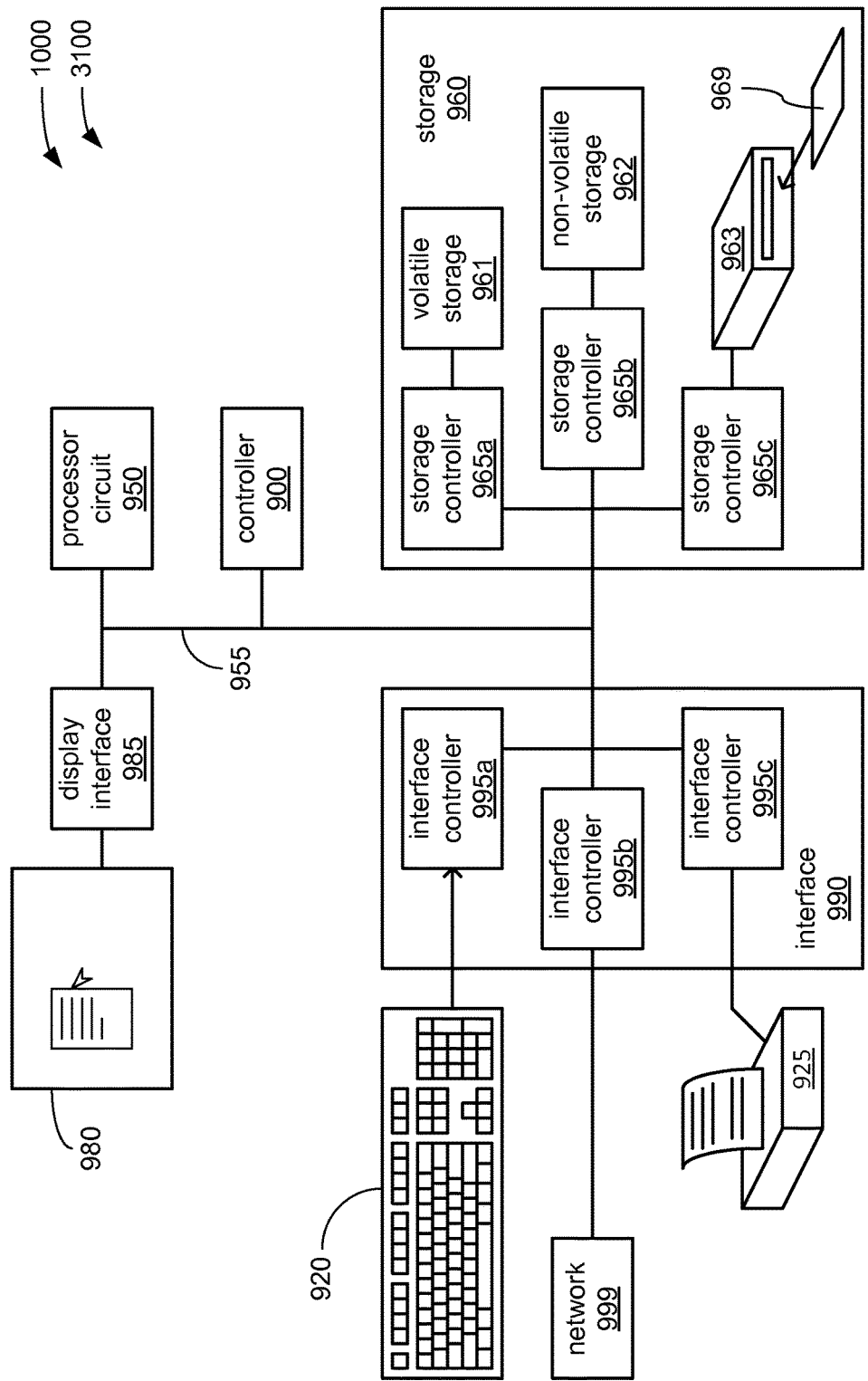
FIG. 11 illustrates an embodiment of a processing architecture.

FIG. 11 illustrates an embodiment of an exemplary processing architecture 3100 suitable for implementing various embodiments as previously described. More specifically, the processing architecture 3100 (or variants thereof) may be implemented as part of one or more of the computing devices 100, 300 and 500, and/or by the controller 600. It should be noted that components of the processing architecture 3100 are given reference numbers in which the last two digits correspond to the last two digits of reference numbers of components earlier depicted and described as part of each of the computing devices 100, 300 and 500, as well as the controller 600. This is done as an aid to correlating such components of whichever ones of the computing devices 100, 300 and 500, and/or the controller 600 may employ this exemplary processing architecture in various embodiments.

The processing architecture 3100 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3100, a computing device comprises at least a processor circuit 950, a storage 960, an interface 990 to other devices, and coupling 955. As will be explained, depending on various aspects of a computing device implementing the processing architecture 3100, including its intended use and/or conditions of use, such a computing device may further comprise additional components, such as without limitation, a controller 900.

The coupling 955 is comprised of one or more buses, point-to-point interconnects, transceivers, buffers, crosspoint switches, and/or other conductors and/or logic that communicatively couples at least the processor circuit 950 to the storage 960. The coupling 955 may further couple the processor circuit 950 to one or more of the interface 990 and the display interface 985 (depending on which of these and/or other components are also present). With the processor circuit 950 being so coupled by couplings 955, the processor circuit 950 is able to perform the various ones of the tasks described at length, above, for whichever ones of the computing devices 100, 300 and 500, and/or the controller 600 implement the processing architecture 3100. The coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor circuit 950 (corresponding to one or more of the processor circuits 150, 350, 550 and 650) may comprise any of a wide variety of commercially available processors, employing any of a wide variety of technologies and implemented with one or more cores physically combined in any of a number of ways.

As previously discussed, the storage 960 (corresponding to one or more of the storages 160, 360, 560 and 660) may comprise one or more distinct storage devices based on any of a wide variety of technologies or combinations of technologies. More specifically, as depicted, the storage 960 may comprise one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor circuit 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and comprises one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and comprises one or more optical and/or solid-state disk drives employing one or more pieces of removable machine-readable storage media 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage media 969.

One or the other of the volatile storage 961 or the non-volatile storage 962 may comprise an article of manufacture in the form of a machine-readable storage media on which a routine comprising a sequence of instructions executable by the processor circuit 950 may be stored, depending on the technologies on which each is based. By way of example, where the non-volatile storage 962 comprises ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 962 may comprise banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor circuit 950 may initially be stored on the machine-readable storage media 969, and the removable media storage 963 may be subsequently employed in copying that routine to the non-volatile storage 962 for longer term storage not requiring the continuing presence of the machine-readable storage media 969 and/or the volatile storage 961 to enable more rapid access by the processor circuit 950 as that routine is executed.

As previously discussed, the interface 990 (corresponding to one or more of the interfaces 190, 390 and 590) may employ any of a variety of signaling technologies corresponding to any of a variety of communications technologies that may be employed to communicatively couple a computing device to one or more other devices. Again, one or both of various forms of wired or wireless signaling may be employed to enable the processor circuit 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995*b* may employ any of a variety of cabling-based or wireless signaling, timings and/or protocols to access other computing devices through the depicted network 999 (perhaps a network comprising one or more links, smaller networks, or perhaps the Internet). The interface 995*c* may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually comprises) a display (e.g., the depicted example display 980), such a computing device implementing the processing architecture 3100 may also comprise the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

Further, where the display interface 985 is present in a computing device implementing the processing architecture 3100, an ocular tracker 981 may also be coupled to the interface 985 to track ocular movements of at least one eye of a person viewing the display 980. Alternatively, the ocular tracker 981 may be incorporated into the computer architecture 3100 in some other manner. The ocular tracker 981 may employ any of a variety of technologies to monitor ocular movements, including and not limited to, infrared light reflection from the cornea.

More generally, the various elements of the computing devices 100, 300 and 500, and/or the controller 600, may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus comprises a controller processor circuit, and a controller storage communicatively coupled to the controller processor circuit to store an initial private key and instructions. When executed by the controller processor circuit the instructions cause the controller processor circuit to create a first signature using the initial private key, transmit the first signature to an issuing server via a network, receive a group public key and an associated member private key from the issuing server, create a second signature using the member private key, transmit the second signature to a member device via the network, receive a third signature from the member device, and authenticate the third signature using the group public key.

The above the example of an apparatus in which a portion of the controller storage comprises nonvolatile memory to store the initial private key, the initial private key stored therein during manufacture of a controller comprising the controller processor circuit and the controller storage.

Either of the above examples of an apparatus in which the controller processor is caused to signal a main processor to enable the main processor to transmit data to the member device based on authentication of the third signature.

Any of the above examples of an apparatus in which the controller processor is caused to receive a first signal from a main processor circuit to transmit the first signature to the issuing server, and create the first signature and transmit the first signature to the issuing server based on the first signal.

Any of the above examples of an apparatus in which the controller processor is caused to receive a second signal from the main processor circuit that indicates detection of the member device, and create the second signature and transmit the second signature to the member device based on the second signal.

Any of the above examples of an apparatus in which the controller processor is caused to receive the third signature and authenticate the third signature based on the second signal.

Any of the above examples of an apparatus in which the apparatus comprises a controller comprising the controller processor circuit and the controller storage, and the main processor circuit, the main processor circuit communicatively coupled to the controller in a manner limiting access to the controller storage to prevent access to at least one of the initial private key, the member private key and the group public key by the main processor circuit.

Another example of an apparatus comprises a main processor circuit, a controller comprising a controller storage to store an initial private key, and a main storage communicatively coupled to the main processor circuit to store instructions. When executed by the main processor circuit, the instructions cause the main processor circuit to signal the controller to transmit a first signature created using the initial private key to an issuing server via a network, receive a signal from the controller that indicates receipt of a member private key and a group public key from the issuing server, detect a member device accessible via the network, signal the controller to transmit a second signature created using the member private key to the member device via the network based on detection of the member device, and receive a signal from the controller that the controller has authenticated the member device.

The above example of another apparatus in which a portion of the controller storage comprising nonvolatile memory to store the initial private key, the initial private key stored therein during manufacture of the controller.

Either of the above examples of another apparatus in which the apparatus comprises controls, and the main processor circuit is caused to receive a signal that indicates operation of the controls that conveys a command to signal the issuing server to either create a new group of member devices or to join an existing group of member devices, and signal the controller to transmit the first signature to the issuing server based on the signal.

Any of the above examples of another apparatus in which the main processor circuit is caused to transmit a request to the issuing server to create a group of member devices, receive a signal from the issuing server that conveys a request for account information to be associated with the group, present the request to an operator, receive a signal that conveys a response to the request, and transmit the response to the issuing server.

Any of the above examples of another apparatus in which the main processor circuit is caused to transmit a request to the issuing server to add the apparatus to an existing group of member devices, receive a signal from the issuing server that conveys a request for account information associated with the existing group, present the request to an operator, receive a signal that conveys a response to the request, and transmit the response to the issuing server.

Any of the above examples of another apparatus in which the main processor circuit is caused to transmit a piece of data to the member device based on receipt of the signal from the controller that the controller has authenticated the member device.

Any of the above examples of another apparatus in which the main processor circuit is caused to receive a signal from the controller that the member device has authenticated the second signature, and receive a piece of data from the member device.

An example of still another apparatus comprises a processor circuit, and a storage communicatively coupled to the processor circuit to store instructions. When executed by the processor circuit, the instructions cause the processor circuit to receive a signature via a network from a member device created with an initial private key, verify the signature using an initial public key associated with the initial private key, signal the member device with a request for information associated with a group of member devices based on verification of the signature, receive a response to the request from the member device, generate a member private key from a group public key and a group private key associated with the group public key; and transmit the group public key and the member private key associated with the group to the member device.

The above example of still another apparatus in which the processor circuit is caused to receive a request from the member device to add the member device to the group, compare the response received from the member device to account information associated with the group to verify authority to add the member device to the group, and generate the member private key from the group public key and the group private key, and transmit the member private key and the group public key to the member device based on verification of the authority.

Either of the above examples of still another apparatus in which the processor circuit caused to receive a request from the member device to create the group, and generate the group public key and a group private key.

Any of the above examples of still another apparatus in which the processor circuit is caused to generate the initial private key and the initial public key.

An example of a computer-implemented method comprises receiving a signature via a network from a member device created with an initial private key, verifying the signature using an initial public key associated with the initial private key, signaling the member device with a request for information associated with a group of member devices based on verifying the signature, receiving a response to the request from the member device, generating a member private key from a group public key and a group private key associated with the group public key, and transmitting the group public key and a member private key associated with the group to the member device.

The above example of a computer-implemented method in which the method comprises receiving a request from the member device to add the member device to the group, comparing the response received from the member device to account information associated with the group to verify authority to add the member device to the group, and generating the member private key from the group public key and the group private key, and transmitting the member private key and the group public key to the member device based on verifying the authority.

Either of the above examples of a computer-implemented method in which the method comprises receiving a request from the member device to create the group, and generating the group public key and a group private key.

Any of the above examples of a computer-implemented method in which the method comprises generating the initial private key and the initial public key.

The invention claimed is:

1. An apparatus comprising:
a controller storage to store an initial private key; and
logic to:
create a first signature based on the initial private key;
transmit the first signature with a request to an issuing server via a network;
receive a request for account information in response to the request transmitted to the issuing server;
identify account information based on input from an operator in response the request received from the issuing server;
transmit the account information to the issuing server;
receive a group public key and an associated member private key from the issuing server in response to transmission of the account information to the issuing server;
detect a member device;
create a second signature based on the member private key in response to detection of the member device;
transmit the second signature to the member device;
receive a third signature from the member device; and
authenticate the third signature based on the group public key.

2. The apparatus of claim 1, a portion of the controller storage comprising nonvolatile memory to store the initial private key, the initial private key stored therein during manufacture of a controller comprising the controller storage and the logic.

3. The apparatus of claim 1, the logic to signal a main processor to enable the main processor to transmit data to the member device in response to authentication of the third signature.

4. The apparatus of claim 1, the logic to:
receive a first signal from a main processor circuit to transmit the first signature to the issuing server; and
create the first signature and transmit the first signature to the issuing server in response to receipt of the first signal.

5. The apparatus of claim 4, the logic to:
receive a second signal from the main processor circuit that indicates detection of the member device; and
create the second signature and transmit the second signature to the member device in response to receipt the second signal.

6. The apparatus of claim 5, the logic to receive the third signature and authenticate the third signature in response to receipt of the second signal.

7. The apparatus of claim 4, comprising:
a controller comprising the controller storage and the logic; and
the main processor circuit, the main processor circuit communicatively coupled to the controller in a manner limiting access to the controller storage to prevent access to at least one of the initial private key, the member private key and the group public key by the main processor circuit.

8. The apparatus of claim 4, the main processor to:
signal the controller to transmit the first signature to the issuing server via the network;
receive a signal from the controller that indicates receipt of the member private key and the group public key from the issuing server;
detect the member device via the network;
signal the controller to transmit the second signature to the member device in response to detection of the member device; and
receive a signal from the controller that the controller has authenticated the member device by authentication of the third signature.

9. The apparatus of claim 4, comprising controls, the main processor circuit to:
receive a second signal that indicates operation of the controls that conveys a command to signal the issuing server to either create a new group of member devices or to join an existing group of member devices; and
transmit the first signal to the controller in response to receipt of the second signal.

10. The apparatus of claim 1, the main processor circuit caused to:
present the request for account information to the operator;
receive input from the operator that conveys a response to the request; and
transmit the response to the issuing server.

11. At least one machine-readable non-transitory storage medium comprising instructions that when executed by a controller of a computing device, cause the controller to:
create a first signature based on an initial private key stored in a storage of the controller of the computing device;
transmit the first signature with a request to an issuing server via a network;
receive a request for account information in response to the request transmitted to the issuing server;
identify account information based on input from an operator in response the request received from the issuing server;
transmit the account information to the issuing server;
receive a group public key and an associated member private key from the issuing server in response to transmission of the account information to the issuing server;
detect a member device;
create a second signature based on the member private key in response to detection of the member device;
transmit the second signature to the member device;
receive a third signature from the member device; and
authenticate the third signature based on the group public key.

12. The at least one machine-readable non-transitory storage medium of claim 11, the controller caused to signal a main processor of the computing device to enable the main processor to transmit data to the member device in response to authentication of the third signature.

13. The at least one machine-readable non-transitory storage medium of claim 11, the controller caused to:
receive a first signal from a main processor circuit to transmit the first signature to the issuing server; and
create the first signature and transmit the first signature to the issuing server in response to receipt of the first signal.

14. The at least one machine-readable non-transitory storage medium of claim 13, the controller caused to:
receive a second signal from the main processor circuit that indicates detection of the member device; and
in response to receipt of the second signal, create the second signature, transmit the second signature to the member device, receive the third signature and authenticate the third signature.

15. An apparatus, comprising:
memory; and
logic, at least a portion of which is implemented in circuitry coupled to the memory, the logic to:
receive a signature with a request to join or create a group of member devices via a network from a member device, the signature created with an initial private key;
verify the signature based on an initial public key associated with the initial private key;
signal the member device with a request for account related information associated with the group of member devices based on verification of the signature, the request for account related information to cause the member device to identify the account related information based on input from an operator;
receive a response to the request from the member device;
authorize the request to join or create the group of member devices based on the response to the request from the member device;
generate a member private key from a group public key and a group private key associated with the group public key, the group public key and the group private key generated at creation of the group of member devices; and
transmit the group public key and the member private key associated with the group to the member device.

16. The apparatus of claim 15, the logic to:
receive a request from the member device to add the member device to the group;
compare the response received from the member device to account information associated with the group to verify authority to add the member device to the group; and
generate the member private key from the group public key and the group private key, and transmit the member private key and the group public key to the member device based on verification of the authority.

17. The apparatus of claim 15, the logic to:
receive a request from the member device to create the group; and
generate the group public key and the group private key.

18. The apparatus of claim 15, the logic to generate the initial private key and the initial public key.

19. At least one machine-readable non-transitory storage medium comprising instructions that when executed by a computing device, cause the computing device to:
receive a signature with a request to join or create a group of member devices via a network from a member device, the signature created with an initial private key;
verify the signature based on an initial public key associated with the initial private key;
signal the member device with a request for account related information associated with the group of member devices based on verification of the signature, the request for account related information to cause the member device to identify the account related information based on input from an operator;
receive a response to the request from the member device;
authorize the request to join or create the group of member devices based on the response to the request from the member device;
generate a member private key from a group public key and a group private key associated with the group public key, the group public key and the group private key generated at creation of the group of member devices; and
transmit the group public key and the member private key associated with the group to the member device.

20. The at least one machine-readable non-transitory storage medium of claim 19, the computing device caused to:
receive a request from the member device to add the member device to the group;
compare the response received from the member device to account information associated with the group to verify authority to add the member device to the group; and
generate the member private key from the group public key and the group private key, and transmit the member private key and the group public key to the member device based on verification of the authority.

21. The at least one machine-readable non-transitory storage medium of claim 19, the computing device caused to:
receive a request from the member device to create the group; and
generate the group public key and the group private key.

22. The at least one machine-readable non-transitory storage medium of claim 19, the computing device caused to generate the initial private key and the initial public key.

* * * * *